Dec. 29, 1964     E. E. STAHLY     3,163,616
P-PHENYLENEDIAMINE STABILIZERS FOR ELASTOMERS
AND COMPOSITIONS CONTAINING THE SAME
Filed Aug. 31, 1956     4 Sheets-Sheet 4

FIG. 4

INVENTOR.
ELDON E. STAHLY
BY
Hall & Houghton
ATTORNEYS

United States Patent Office 3,163,616
Patented Dec. 29, 1964

3,163,616
P-PHENYLENEDIAMINE STABILIZERS FOR ELASTOMERS AND COMPOSITIONS CONTAINING THE SAME
Eldon E. Stahly, Birmingham, Mich., assignor, by direct and mesne assignments, of three-fourths to Oliver W. Burke, Jr., Grosse Pointe, Mich., and one-fourth to Eastman Kodak Company, Rochester, N.Y., a corporation of New Jersey
Filed Aug. 31, 1956, Ser. No. 607,318
8 Claims. (Cl. 260—28.5)

This invention relates to new chemical compounds which are useful for inhibiting polymers such as elastomers and plastomers against deterioration by oxidative attack, more particularly by ozone, and to stabilize elastomer compositions containing the same.

It is well known that polymers such as elastomers, particularly those containing residual unsaturation, tend to crack due to attack by ozone, and such crack-formation in elastomer articles progressively increases with time and causes failure in the intended usage of such items, e.g., tires, sealing strips, insulating cables, windshield wipers, gaskets, etc. The more nearly saturated elastomers, such as butyl rubber, and certain polar substituted unsaturated elastomers such as neoprene are per se less subject to cracking via ozone attack, but such elastomers when plasticized for many uses, e.g., for low temperature performance, become subject to cracking by ozone. Hence in application it is found generally desirable to protect most known elastomers against ozone attack.

It is an object of this invention to provide a new class of organic compounds which are highly effective for retarding and preventing entirely, for extended periods of time, the development of cracks, due to ozone attack, in elastomer compositions in static usages. A further object is to provide synergistic antiozonant compositions which display this same stabilizing effect against ozone and which do not develop blooms of undesirable dark colors. A still further object is to provide useful stabilized and protected vulcanized elastomer compositions which retain the effectiveness of the new stabilizers during dynamic usages of the elastomer compositions wherein temperatures of 100° C. are developed. Such new stabilizers are termed antiozonants herein.

It has now been found that excellent elastomer stabilizing properties, particularly against ozone attack, are possessed by N-alkyl-N'-phenyl-p-phenylenediamines in which the alkyl group contains from 1 to 19 carbon atoms. Members of this class in which the alkyl group contains from 1 to 9 carbons are especially effective. The formula of these compounds may be represented by in which R represents alkyl groups. R may be primary, secondary or tertiary alkyl groups; it may be a branched or straight chain alkyl group, and it may be substituted with aryl or cycloalkyl radicals. This class of new antiozonants includes the smaller more restricted class of compounds found useful as gasoline antioxidants and disclosed in U.S. patent 2,734,808. It is also called to attention in said U.S. patent that desirable gasoline antioxidants are not ipso facto good rubber stabilizers. Therefore prior to this invention it was not predictable that this new class of compounds would be effective antiozonants for rubber.

Several examples containing alkyl groups in the preferred range of number of carbon atoms are: N-phenyl-N'-isopropyl-p-phenylenediamine, N-phenyl-N'-sec-butyl-p-phenylenediamine, N - phenyl-N'-2-octyl-p-phenylenediamine, N - phenyl-N'-2-ethylhexyl-p-phenylenediamine, N - phenyl-N'-1-ethyl - 3 - methylpentyl-p-phenylenediamine, N - phenyl-N'-(1-isobutylisoamyl)-p-phenylenediamine, N-phenyl-N'-1-phenylethyl - p - phenylenediamine and N - phenyl-N'-benzyl-p-phenylenediamine. Further examples of members of this class of substituted p-phenylenediamines containing an N-phenyl group which are useful as antiozonants are the following derivatives thereof: N'-methyl-, N'-ethyl-, N'-isobutyl-, N'-tert-butyl-, N'-2-amyl-, N'-isoamyl-, N'-1-amyl-, N'-(1,3-dimethylbutyl)-, N' - 1 - methylhexyl, N'-(1-methyloctyl)-, N'-1-methyldecyl-, N'-4-(2,6,8-trimethylnonyl)-, N'-2-tridecyl-, N'-2-pentadecyl-, N'-2-heptadecyl-, and N' - 2 - nonadecyl-. Compounds of this type in which the alkyl group contains more than 19 carbon atoms possess some antiozonant properties but are less practical when used alone because of their greater molecular weight and lower migratability in the elastomer compositions incorporating them; but are useful in admixtures with lower alkyl substituted members of this class of compounds.

The lowest and intermediate members of this class of compounds are liquids freezing near room temperature while the higher members are solids. N-phenyl-N'-isopropyl-p-phenylenediamine has been made the subject of a divisional application since it is unique in that it melts at about 75° C. whereas the N-phenyl-N'-octyl derivatives are solids of lower melting point (i.e., below room temperature). N-phenyl-N'-1-phenylethyl is a solid of >100° C. M.P. and N-phenyl-N'-tridecyl derivative is a liquid and N-phenyl-N'-2-heptadecyl-p-phenylenediamine melts at about 100° C. The derivatives containing octyl to nonadecyl alkyl groups distill in the range of 180 to 240° C. at less than 1 mm. mercury pressure.

Thus the new class of compounds disclosed by the present research comprises several distinct groups of more closely related compounds: (1) the unique N-phenyl-N' isopropyl derivative which is the subject of a divisional application and hence is not claimed herein, (2) the higher $C_4$ to $C_{19}$ secondary and tertiary alkyl derivatives in which the secondary or tertiary alkyl substituent may be straight chain or branched, and may be substituted with aryl or cycloalkyl radicals, which group or category is claimed herein, (3) the primary $C_1$ to $C_{19}$-alkyl derivatives, which may also be straight chain or branched and may be substituted with aryl or cycloalkyl radicals, which constitute a further category separate from that claimed herein.

The various members of this new class of antiozonants may be prepared by reductive alkylation of p-amino-, p-nitroso-, or p-nitrodiphenylamine with hydrogen and the appropriate carbonyl compound, i.e., the aldehyde or ketone containing the desired number of carbon atoms. Thus, 2-octanone, hydrogen and p-nitrosodiphenylamine are reacted in one step at elevated temperatures (50 to 150° C.) in the presence of catalysts such as platinum, Raney nickel or copper oxide-chromium oxide combinations. They may also be prepared from the p-amino-diphenylamine and the dialkyl sulfate containing the desired alkyl groups. Thus dimethyl sulfate or diethyl sulfate can be reacted with p-amino-diphenylamine in an aqueous dioxane medium containing sodium hydroxide to provide the N-phenyl-N'-methyl- or N-phenyl-N'-ethyl-p-phenylenediamine respectively.

The antiozonants of this invention are effective in retarding and inhibiting the cracking of vulcanized elastomer items resulting from ozone attack. Unprotected elastomer compositions are quite rapidly deteriorated via ozone attack, GR–S and natural rubber articles for example in high ozone areas such as Los Angeles showing visual cracks in a matter of relatively few hours after being exposed to the atmosphere, whereas identical elastomer compositions into which 1 to 5 pts. of one of the new class of antiozonants of this invention are incorporated do not crack under several years of exposure to the same atmosphere. The present new antiozonant compositions are especially valuable for protecting elastomer articles in dynamic usages wherein temperatures above 100° C. are attained. The compatibility of the new antiozonants with rubber is such that the migration characteristics are optimum for maintaining a concentration of antiozonant at the surface of the elastomer article adequate to give protection against ozone, but a concentration not so high that the antiozonant is rapidly depleted by surface volatilization.

SYNERGISM

This invention further provides synergistic antiozonant compositions comprising mixtures of one or more of the new phenylenediamine derivatives with rubber antioxidants and/or certain thioamide derivatives, and waxes including paraffinic and microcrystalline waxes and blends thereof. Thus a mixture comprising from 1 to 9 parts of the new N-phenyl-N'-alkyl-p-phenylenediamine antiozonants, 0 to 9 parts of a rubber antioxidant (Table A) and/or a thioamide (Table A), and 0 to 9 parts wax have been found effective for protecting elastomer compositions against ozone attack. Such antioxidants, thioamides and waxes per se do not protect elastomers in dynamic usage against ozone attack. In such synergistic combinations, however, as little as 0.5 part of the substituted phenylenediamine antiozonants of the present invention per 100 parts of elastomer composition demonstrate effective antiozone activity in rubber compositions in dynamic uses.

In the accompanying drawings pertaining to representative embodiments of the invention.

The antiozonants of this invention can also serve as parent compounds for perparation of derivatives wherein at least one of the two remaining hydrogens on the two nitrogens of R—NH—R'—NHR" are substituted with alkyl groups, nitroso, cyanohydrocarbon, poly(cyanoalkyl)polyamino, or acyl groups. Such derivatives of these parent compounds are part of the invention of the present inventor disclosed in U.S. application, Ser. No. 606,767, filed August 28, 1956, and are not claimed herein.

Table A

ANTIOXIDANTS SHOWING SYNERGISM WITH ANTIOZONANTS

Amines:
    6-ethoxy-2,2,4-trimethyl-1,2 - dihydroquinoline (Santoflex AW)
    2,2,4-trimethyl-1,2-dihydroquinoline polymer (Agerite Resin D)
    Diphenylamine-acetone condensation products (BLE and Flectol H)[1]
    Phenyl-beta-naphthylamine (PBNA)
    Phenyl-alpha-naphthylamine (PANA or Neozone A)

*Table A—Continued*

Aniline-acetone condensation products [1]
    Aniline-butyraldehyde condensation products [2]
    Dialpha-naphthylamine
    Di-beta-naphthylamine
    Phenylenediamine, o-, m-, and p-forms
    p,p'-diaminodiphenylmethane (Tonox)
    p-aminodiphenylamine
    1,2-dianilinoethane (diphenylethylenediamine)
    o-tolidine
    N,N'-diphenyl-p-phenylenediamine (Perflectol X)
    Naphthylenediamine
    Di-p-methoxydiphenylamine (Thermoflex)
    N,N'-di-sec-butyl-p-phenylenediamine (Tenamene 2)
    N,N'-di-beta-naphthyl - p - phenylenediamine (Agerite resin White)
    N,N'-di-beta-ac - tetrahydronaphthyl - p - phenylenediamine
    N,N'-di-alpha-naphthyl-p-phenylenediamine
    Tetraethylenepentaminopropionitrile
    Mixture of isopropoxydiphenylamine, diphenylphenylenediamine and phenyl-beta-naphthylamine (Agerite Hipar)
    Rosin Amine D [3]
    Dodecylamine 1
    N,N'-tetramethyl-p,p'-di(aminophenyl)methane
    N-dimethyl-p-phenylenediamine
    The cyanoalkylamines of R. G. Jennen's copending application, Ser. No. 556,432, filed December 30, 1955, now abandoned [4]

Phenolic:
    Parazone (p-phenylphenol)
    Santovar O (2,5-ditert-butyl hydroquinone)
    Hydroquinone
    Antioxidant 2246 (a p,p'-bisphenol, namely, 2,2'-methylene-bis(6-tert-butyl-p-cresol), produced by American Cyanamid Company
    Santowhite Flakes (a dibutyl-phenol sulfide, namely, 4,4'-thio-bis(6 - tert - butyl-m-cresol), produced by Monsanto Chemical Co.

Phosphites:
    Triphenyl phosphite
    Tri(nonylphenyl)phosphite (Polygard)

Aromatic esters:
    Glycerol monosalicylate ester
    Dipropylene glycol monosalicylate ester Thioamides:
    Thioacetanilide
    Thiocarbanilide
    Thioacetamide
    Dibenzylthiourea
    Phenylacetothiomorpholide The amounts of the new antiozonants and of the synergistic antiozonant compositions containing these new antiozonants which are required to attain effective protection of vulcanized elastomer compounds against ozone attack is dependent to some extent on the type of elastomer to be protected and its intended usage, but in general will lie within the range of 2 to 5 parts per one hundred of rubber. Where unusually high ozone concentrations are to be met, e.g., in zones where ozone is generated by electric generators, even larger amounts may be required, even up to 10 pts./100 pts. elastomer. The required concentration is readily determined by prior ozone exposure tests of several preliminarily compounded samples containing varying amounts of antiozonant or anti-

---

[1] See "College Outline Series, Organic Chemistry," by Degering, Barnes & Noble, Inc., New York, 1951, page 268.
[2] These aniline-butyraldehyde reaction products are commercial products marketed as "Beutene" (Naugatuck Chemical Co.), "Antox," and "Accelerator 808" (Du Pont Chemical Co.), and "A–32" (Monsanto Chemical Co.), see also footnote 1, above.
[3] Trade name for technical grade dehydroabietylamine, see Condensed Chemical Dictionary, Reinhold Publ. Corp., N.Y. (1956), page 950.
[4] Corresponding Belgian Patent No. 553,700; corresponding French Patent No. 1,170,742.

ozonant composition under conditions simulating those of the intended usage. Other materials such as dyes, metal deactivators, and the like may be employed in conjunction with the antiozonants and synergistic antiozonant compositions of this invention.

PREPARATION AND TESTING PROCEDURES

The procedures employed in compounding and testing the elastomer-amino-additive compositions for Tables I, II and III herein was as follows: as control samples "cold" GR–S synthetic rubber (GR–S 1500 polymerized at 41° F. or GR–S 1600 which is the same except that 50 parts HAF carbon black are incorporated at the polymer plant) was compounded and vulcanized according to best known commercial practice to obtain good aging properties. Then smiliar compounds were prepared and vulcanized with my new antiozonants present as additives. The recipes employed, with Santoflex AW for the control compounds replaced by varying quantities of the antiozonant as indicated in the several tables, were as follows:

| Components: | Tables I, II, parts by weight |
|---|---|
| GR–S 1500 [3] | 100. |
| HAF carbon black [3] | 40 to 50. |
| EPC carbon black [3] | 0 to 10. |
| Zinc oxide | 3. |
| Stearic acid | 1 to 3. |
| Phenylbetanaphthylamine (PBNA) | 1 to 1.25. |
| Circo Light Oil [1] | 2.5 to 3.5. |
| Para-Flux 2016 [1] | 2.5 to 3.5. |
| Sunproof, Heliozone, or Atlantic 1115 wax | 0 to 3.0. |
| Santocure (accelerator) [2] | 1.25. |
| Sulfur | 2.0. |
| Additives | As shown. |

[1] Commercial plasticizing oils (see book entitled "Compounding Ingredients for Rubber," published 1947 by India Rubber World, New York, N.Y.).
[2] Santocure is the trade name for N-cyclohexyl-2-benzothiazole sulfenamide.
[3] GR–S 1500 and the carbon blacks were occasionally replaced in these compounds by GR–S 1600 which is identical with GR–S 1500 except that it already contained 50 parts HAF black.

The recipes for other elastomers tested (Table III) are shown in the following tabulation:

The various elastomer samples were cured at about 1000 p.s.i. in a steam heated press at 285° F. with curing times adjusted in the range from 30 to 120 minutes, as required to obtain optimum tensile properties for each specific compound. Samples of each of the cured stocks were heat aged for 24 to 48 hours at 100° C. and were then subjected to ozone exposures in both dynamic and static tests.

The examples in the tables herein are limited to sulfur cured vulcanizates, however, sulfurless curing systems for example with tetramethylthiuramidisulfide peroxide curing systems, such as with dicumyl peroxide; benzoquinone dioxime; radiation curing systems using a radiation source such as cobalt 60, metal oxide curing of acid elastomers as for example zinc oxide and butadiene-acrylic acid copolymers and similar curing systems can effectively be used with elastomers containing the antiozonants and synergistic antiozonant compositions.

The dynamic ozone test was conducted on ½-inch dumbbell specimens of the vulcanizates. The exposure to ozone was carried out in an aluminum-lined ozone cabinet where the concentration of ozone was usually held at $50\pm5$ p.p.h.m. of air. This high ozone concentration is used ($25\pm5$ p.p.h.m. is specified by ASTM Test D1149–51T) to demonstrate the protective effect of the antiozonants in a reasonably short time of evaluation and to approximate the atmospheric ozone concentrations reported at hgh altitudes attained by aircraft, and at ground level in the Los Angeles area, to parts of New Mexico and Alaska under certain climatic conditions. Occasionally more highly accelerated ozone exposure tests were conducted by employing ozone concentrations as high as 150 p.p.h.m. With such high ozone concentrations much shorter times are required to obtain valid comparisons of the protective action of the additves under test (e.g., Table I, Groups D and E). Each sample was stretched and relaxed continuously at a rate of 30 times per minute between 0 and 20% elongation on the total sample (0 to 28% on the narrow portion suffering the elongation) to simulate conditions of dynamic use of the rubber. After each test, usually of 40 to 70 hours' duration, a specimen taken from the center part of the narrow part of the dumbbell was placed under the microscope and the depth of the observed cracks was measured. The depths of the

| Elastomer (100 pts.) | Neoprene Type WHV | Nitrile Rubber Hycar 1014 | Mass[1] BD–S Polymer | Butyl GR-I-17 | Polybutadiene or Natural Rubber |
|---|---|---|---|---|---|
| Ingredients: [a] | | | | | |
| Philblack "O" | | | 50 | | |
| Thermax (carbon black) | 150 | | | | |
| Statex 125 (carbon black) | | 40 | | | |
| Micronex W-6 (carbon black) | | | | 65 | 50 |
| Zinc oxide | 5.0 | 3.0 | 3.0 | 5.0 | 3.0 |
| Stearic acid | 0.5 | 1.0 | 1.0 | 3.0 | 2.5 |
| PBNA | | | 1.5 | | 1.0 |
| BLE-25 | | 1.5 | | | |
| Agerite Resin D | | | 1.0 | | |
| Neozone A | 2.0 | | | | |
| TP-90B (plasticizer) [b] | | 16.0 | | | |
| Dioctylphthalate (plasticizer) | 30.0 | | | | |
| Pine Tar | | | | | 4.0 |
| Circo Light Oil | | | | 20 | |
| Atlantic 1115 wax | 0–1.5 | 0–1.5 | 0–1.5 | 0–3.0 | 0–1.5 |
| Light Calcined MgO | 4.0 | | | | |
| Altax (Benzothiazyl disulfide) | 0.5 | 1.5 | 1.5 | 0.5 | 1.0 |
| Monex [c] | 0.5 | | | | |
| Methyl Tuads [d] | | | | 1.0 | |
| Sulfur | 0.5 | 1.5 | 1.5 | 2.0 | 2.5 |
| Antiozonant and additives | | | as shown | | |

[1] Oil-extended polymer from sodium catalyst polymerization; contains 20 to 25 parts petroleum oil extender.
[a] Curing ingredients are defined in "Compounding Ingredients for Rubber" 2nd edition, published by India Rubber World, 1947.
[b] A high molecular weight polyether (Thiokol Corp.).
[c] Tetramethylthiuram monosulfide.
[d] Tetramethylthiuram disulfide.

For neoprene and butyl rubber the plasticization required for low temperature performance results in nullifying a major portion of the inherent ozone resistance of the polymer itself, and accordingly the anitozonants of the present invention are useful in such neoprene and butyl stocks.

deeper 50% of the observed cracks were averaged, and this average was designated the "A value" and was taken as the index of ozone atack. With each experimental sample a control sample containing Santoflex AW was simultaneously subjected to the same dynamic ozone test, and the average crack depth "A value" was compared with the "A value" for the crack depths of this control sample as a basis of evaluation.

In the work on which this application and said copending application has been based, it has been demonstrated that where antiozone protection is obtained in the dynamic tests, protection is also afforded in static use. The static tests run on both heat-aged and unaged samples showed this to be true without exception. (The converse is not always true, e.g., some static protection is afforded by paraffin and microcrystalline waxes, which are valueless for protection of rubber articles subjected to dynamic usages.) Specimens for static testing were mounted in accordance with ASTM procedure D518–44, Method B. The mounted samples were placed in the ozone exposure cabinet wherein the ozone concentration was held at a concentration of 50±5 at a temperature of 40° C. In this static test the samples were observed periodically and the time was measured to the appearance of the first crack. Table I shows data for typical static tests performed on examples according to the invention of the present application wherein the tests were terminated after 6 weeks according to current practice of rubber testing laboratories, since such static test data is merely confirmative of data obtained dynamically, further static ozone exposure test data for the antiozonants of the present application are omitted herefrom for the sake of brevity. It suffices to state that long continued tests show that where virtual immunity against ozone was obtained with an antiozonant or a synergistic antiozonant composition in a 40 hour test at 50±5 p.ph.m. of ozone, static protection up to 6 months was obtained at the same ozone concentration (i.e., 50 p.ph.m.) without appearance of ozone cracks. The Santoflex AW controls showed severe cracking in the 40 hour test and failed in about 100 hours or less under the same static test conditions.

Similarly mounted panels of specimens (ASTM procedure D518–44) were also statically tested in outdoor weather experiments in Florida (Miami), California (Los Angeles), and Michigan (Detroit). In California, where highest concentrations of ozone occurred over the time of the test (varied from 5 to 60 p.ph.m. dependent on weather variations) up to six months outdoor exposure were required to develop cracks (ASTM rating 4) in the samples containing antiozonants or synergistic antiozonant compositions. The Santoflew AW controls not only cracked but failed in a month under simultaneous exposure. In the Florida and Michigan tests the protected samples did not crack in a one-year test whereas the control samples not ony cracked but failed in the same test. The rating method for the static exposure tests is shown by the following tabulation.

| Developments in static tests: | Rating |
|---|---|
| No developments of any kind | 0 |
| Microscopic cracking | 1 |
| Fine visible cracking | 2 |
| Pronounced visible cracking | 3 |
| Severe visible cracking | 4 |

SYNERGISM

In more detail, the second part of the present invention comprises the discoveries of antiozonant compositions which rely on the action of synergistic antiozidants, paraffin and/or microcrystalline waxes in combination with specific derivatives of p-phenylenediamines. When used in more than 3 parts per 100 parts of elastomer the said derivatives of p-phenylenediamine give virtual immunity to ozone attack per se. However, in combinations with certain antiozidants it has been found that reduced amounts (e.g., 0.5 to 3.0 parts) of the said specific p-phenylenediamine derivatives in combinations with 1.5 to 6 pts. total of specific antioxidants serve to protect elastomers against ozone deterioration, although the antioxidants by themselves do not impart ozone resistance to the elastomer compounds, nor do the reduced amounts of said specific diamino derivatives alone (i.e., in the absence of the specific antioxidants) show adequate protection of the elastomer compounds. Such admixed and/or interacted components which develop antiozonant activity in protection of elastomers and plastomers are termed herein "synergistic compositions."

Thus I have made the discovery that certain antioxidants identified herein (see Table A), themselves incapable of protecting elastomers and plastomers against ozone, have the property of greatly increasing the effectiveness of reduced amounts of my specific antiozonants in elastomer and plastomer compositions. Such antioxidants I refer to herein as "synergists."

Still another alternative interpretation of my invention is that a small amount of a diamino antiozonant, which itself can impart ozone resistance to elastomer and plastomer compositions incorporating said derivative in certain minimum amounts can develop ozone resistance in antioxidants when admixed therewith in less than such minimum amounts.

The mechanism of the action of such antioxidants in synergistic antiozonant compositions is not entirely understood. One possible explanation is that the diamino antiozonants themselves may enter to some extent into the complex vulcanization reactions in the curing of the elastomer compositions, and that the synergistic antioxidant alters the degree to which the diamino antiozonant so enters the vulcanization reaction. Another possible explanation involves an alteration of migratability characteristics of the antiozonant by the addition of antioxidants. However, the exact mechanism is immaterial to the practice of the invention which the subsequently discussed data serve to exemplify.

Figure 4:
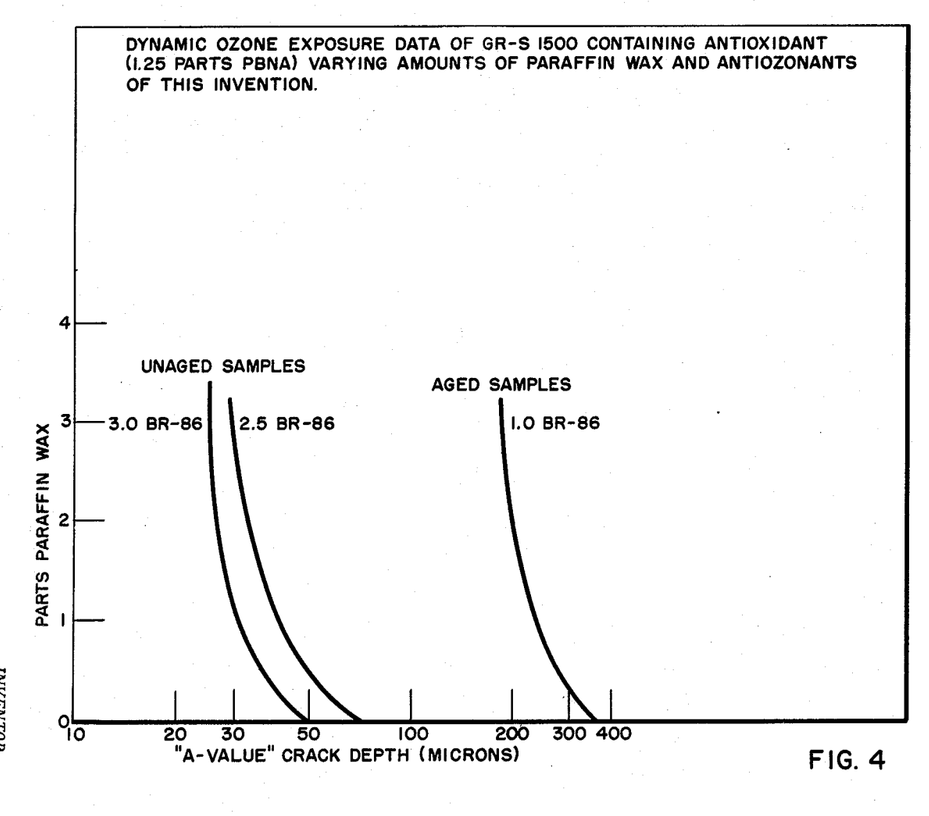

It is demonstrated that the wax component is an important component of some of the synergistic compositions. Thus virtual immunity resulted with 2.5 parts BR–86 (N-phenyl-N'-2-octyl-p-phenylenediamine), 1.25 pt. PBNA and 0.5 part wax; whereas with the same amounts of BR–86 and PBNA but with no wax present virtual immunity was not attained (FIG. 4). Similar synergistic effect of wax with other antiozonants of the present invention are apparent from the examples of the tables.

I have found that while paraffin and microcrystalline wax and combinations thereof give some protection to static samples of vulcanized elastomers no protection is afforded vulcanized elastomers in dynamic usage. My findings confirm John O. Cole. In G. S. Whitby's treatise entitled "Synthetic Rubber," published in 1954 by John Wiley & Sons, Inc., New York City, on page 541, Mr. Cole states, "It should be pointed out that, under dynamic flexing, wax offers no protection to either GR–S or natural rubber" (from the deterioration by ozone).

In contrast to this fact I have shown that waxes when used with the antiozonants of this invention act synergistically, that is, they enhance the protection value of the antiozonants.

OBSERVED RESULTS

Many representative amino compounds, diamino compounds, polyamino compounds and derivatives thereof were tested in GR–S 1500 wherein no adequate protection of vulcanized GR–S synthetic rubber against ozone attack was obtained either before or after the GR–S synthetic rubber vulcanizate was subjected to accelerated aging at elevated temperatures. The results of these tests were listed in Table I of copending joint application, S.N. 523,711, filed July 22, 1955. However, they belong to one or more classes of materials known to have antioxidant properties. Santoflex AW was found to be one of the best of such antioxidants and since usage of said antioxidant was acceptable to tire manufacturers in amounts up to 2 pts./100 of elastomers, 2 pts. Santoflex AW was used herein as a standard of comparison. Because of the necessity of having separate controls for each group of samples tested, samples containing Santoflex AW were tested with each group of samples containing other amino compounds to monitor the procedure and to give assurance that the several results were valid for evaluating the relative effectiveness of the several amino compounds for protection of GR–S against ozone attack.

Ortho- and meta-diamino aromatic compounds are relatively inactive as antiozonants, also certain compounds, such as phenyl-alpha-naphthylamine derivatives, although good antioxidants, are not good antiozonants.

A study of Table I of copending joint U.S. application, Ser. No. 523,711, filed July 22, 1955, is sufficient to confirm that most types of amino-antioxidants are of little or no value in compounding elastomers to make ozone-resistant articles of use. Certain compounds show some protection against ozone in comparison with Santoflex AW, but after heat-aging protection against ozone is negligible (e.g., di-sec-butyl-p-phenylenediamine). Also certain diamino compounds such as benzidine and 4-amino-diphenylamine protect against ozone, but also act as accelerators resulting in scorchy stocks not acceptable to the industry.

It should also be called to attention that the GR–S 1500 examples of the present invention contained from 1 to 1.25 parts of either phenyl-beta-naphthylamine (PBNA) or a diphenylamine-acetone condensation product (BLE) in addition to the other additives shown, since such antioxidants were added at the polymerization plant.

Tables I, II and III demonstrate the effectiveness of the antiozonants of the present invention of the formula R—NH—R'—NHR" wherein R is phenyl, R' is p-phenylene and R" is alkyl or cyclohydrocarbon substituted alkyl, the total carbon count of the alkyl or so substituted alkyl containing from 1 to 19 carbon atoms. It will be noted that all are effective for static as well as dynamic protection against ozone attack.

Table I shows protective action in GR–S and natural rubber resulting from incorporation of the antiozonants of the present invention and the great improvement over the controls is readily apparent.

Table II shows similar protection afforded to GR–S by the new antiozonants in samples subjected to the dynamic ozone exposure test and Table III shows the protection afforded other elastomers by the new antiozonants in samples subjected to the dynamic ozone test.

*Table I*

STATIC OZONE TEST WITH TYPICAL EXAMPLES OF THE NEW CLASS OF ANTIOZONANTS IN ELASTOMERS

[(5 pts./100 elastomers) 1.5 pts. paraffinic wax added; 50±5 p.ph.m. Ozone at 40° C., bent loop test (tests terminated at 1008 hrs.)]

| Example | Elastomer | Additive, pts. per hundred elastomer | Unaged, Hrs. at 0 Rating | Aged (24 Hrs. at 100° C.), Hrs. at 0 Rating |
|---|---|---|---|---|
| 1 | GR–S 1500 | Control (2 pts. Santoflex AW) | 5 | 2 |
| 2 | GR–S 1500 | N-Phenyl-N'-isopropyl-p-phenylenediamine | 1,008 | 1,000 |
| 3 | GR–S 1500 | N-Phenyl-N'-2-octyl-p-phenylenediamine | 1,008 | 1,000 |
| 4 | GR–S 1500 | N-Phenyl-N'-1-isobutyl-3 methylbutyl-p-phenylenediamine | 1,008 | 1,000 |
| 5 | GR–S 1500 | N-Phenyl-N'-2-tridecyl-p-phenylenediamine | 1,008 | 1,000 |
| 6 | GR–S 1500 | N-Phenyl-N'-2-ethylhexyl-p-phenylenediamine | 1,008 | 1,000 |
| 7 | GR–S 1500 | N-Phenyl-N'-1-phenylethyl-p-phenylenediamine | 1,008 | 1,000 |
| 8 | GR–S 1500 | N-Phenyl-N'-2-heptadecyl-p-phenylenediamine | 1,008 | 1,000 |
| 9 | GR–S 1500 | N-Phenyl-N'-2-nonadecyl-p-phenylenediamine | 960 | 960 |
| 10 | Natural Rubber | Control (2 pts. Santoflex AW plus 1 pt. PBNA) | 10 | 2 |
| 11 | do | N-Phenyl-N'-isopropyl-p-phenylenediamine | 1,008 | 1,008 |
| 12 | do | N-Phenyl-N'-benzyl-p-phenylenediamine | 1,008 | 1,008 |

*Table II*

GR–S 1500 CONTAINING ANTIOZONANTS OF THE PRESENT INVENTION

[Dynamic ozone exposure: 40 hrs. @ 50±5 p.ph.m. ozone: 40° C.; 30 flexes/minute—p-PD herein is used to designate para-phenylenediamine]

| Example | Code | Pts. Additive | Pts. Paraffin Wax | "A Value" Crack Depth (Microns) Unaged | "A Value" Crack Depth (Microns) Aged 24 Hrs. at 100° C. |
|---|---|---|---|---|---|
| Group A: | | | | | |
| 1 | Control-1 | 2.0 Santoflex AW+1 pt. PBNA | 0.5 | 240 | 460 |
| 2 | Control-2 | 4.0 Santoflex AW+1 pt. PBNA | 0.5 | 75 | 400 |
| 3 | Control-3 | 2.0 Santoflex AW | 1.5 | 225 | 500 |
| 4 | Control-4 | None | 0.0 | >700 | >700 |
| 5 | K-24 | 1.5 N-Phenyl-2-octyl-p-PD+1.5 pts. Tonox | 1.5 | 50 | 75 |
| 6 | K-23 | 3.0 N-Phenyl-N'-2-octyl-p-PD | 1.5 | 30 | 35 |
| 7 | J-32 | 5.0 N-Phenyl-N'-2-octyl-p-PD | 1.5 | 25 | 0 |
| 8 | J-28 | 5.0 N-Phenyl-N'-(1-isobutyl-3-methylbutyl)-p-PD | 1.5 | 30 | 25 |
| 9 | J-33 | 5.0 N-Phenyl-N'-2-tridecyl-p-PD | 1.5 | 85 | 25 |
| 10 | M-22 | {0.25 N-Phenyl-2-octyl-p-PD / 1.75 Mixture of 7 arylenediamines (A)[1] | 1.5 | 120 | 180 |
| 11 | M-3 | {Ditto plus 2.0 pts. of a mixture (B)[2] / 15 antioxidants from Table A | 1.5 | 60 | 85 |
| 12 | Control-5 | 2.0 pts. of same mixture [2] of antioxidants as used in A-11 | 1.5 | 225 | 240 |
| Group B: | | | | | |
| 1 | Control-1 | 2.0 Santoflex AW | 1.5 | 225 | 460 |
| 2 | DA-1 | 2.0 N-Phenyl-N'-2-octyl-p-PD+1.0 pt. stannous stearate | 1.5 | 30 | 50 |
| 3 | M-74 | 3.0 N-Phenyl-N'-2-octyl-p-PD | 1.5 | 50 | [3] 40 (360) |
| 4 | M-75 | 2.0 N-Phenyl-N'-2-octyl-p-PD | 1.5 | 50 | 60 |
| 5 | N-54 | 3.0 N-Phenyl-N'-(1-ethyl-3-methylpentyl)-p-PD | 1.5 | 55 | 50 |
| 6 | N-34 | 1.5 N-Phenyl-N'-2-octyl-p-PD plus 1.5 pts. N,N'-Di-2-octyl-p-PD | 1.5 | 50 | 95 |
| 7 | N-35 | 1.0 N-Phenyl-N'-2-octyl-p-PD plus 1.0 pt. N,N'-Di-2-octyl-p-PD plus 2.0 Santoflex AW | 1.5 | 65 | 90 |
| 8 | N-56 | 3.0 N-Phenyl-N'-1-methylheptyl-p-PD | 1.5 | 80 | 70 |
| 9 | O-65 | 2.0 N-Phenyl-N'-1-methylheptyl-p-PD plus 1 pt. stannous stearate | 0 | 45 | 85 |
| 10 | O-62 | 3.0 N-Phenyl-N'-(1-ethyl-3 methylpentyl)-p-PD | 0 | 45 | 15 |
| 11 | O-64 | 2.0 N-Phenyl-N'-(1-ethyl-3 methylpentyl)-p-PD plus 1.0 stannous stearate. | 0 | 100 | 60 |
| 12 | O-76 | 3.0 N-Phenyl-N'-(1-ethyl-3-methylpentyl)-p-PD | 0 | 20 | 20 |

See footnotes at end of table.

*Table II*—Continued

GR-S 1500 CONTAINING ANTIOZONANTS OF THE PRESENT INVENTION

[Dynamic ozone exposure: 40 hrs. @ 50±5 p.ph.m. ozone: 40° C.; 30 flexes/minute—p-PD herein is used to designate para-phenylenediamine]

| Example | Code | Pts. Additive | Pts. Paraffin Wax | "A Value" Crack Depth (Microns) | |
|---|---|---|---|---|---|
| | | | | Unaged | Aged 24 Hrs. at 100° C. |
| Group C: | | | | | |
| 1 | Control | 2.0 Santoflex AW | 1.5 | 200 | 320 |
| 2 | Q-79 | 5.0 N-Phenyl-N'-2-ethylhexyl-p-PD | 0 | 25 | 45 |
| 3 | R-1 | 4.0 N-Phenyl-2-octyl-p-PD | 1.5 | 20 | 30 |
| 4 | Q-87 | 4.0 N-Phenyl-N'-isopropyl-p-PD | 0 | 0 | 0 |
| 5 | Q-88 | 4.0 N-Phenyl-N'-isopropyl-p-PD | 1.5 | 0 | 0 |
| 6 | T-46 | 4.0 N-Phenyl-N'-isopropyl-p-PD | 1.5 | 10 | 20 |
| 7 | T-31 | 5.0 N-Phenyl-N'-ethyl-p-PD | 0 | 10 | 15 |
| 8 | T-32 | 5.0 N-Phenyl-N'-ethyl-p-PD | 1.5 | 10 | 10 |
| 9 | T-11 | 3.0 N-Phenyl-N'-isopropyl-p-PD | 0 | 30 | 0 |
| 10 | T-9 | 2.0 N-Phenyl-N'-isopropyl-p-PD | 0 | 55 | 0 |
| 11 | T-10 | 2.0 N-Phenyl-N'-isopropyl-p-PD | 1.5 | 45 | 35 |
| 12 | T-7 | 1.0 N-Phenyl-N'-isopropyl-p-PD | 0 | 100 | 250 |
| 13 | V-18 | 5.0 N-Phenyl-N'-methyl-p-PD | 0 | 0 | 0 |

[1] (A) Mixture of arylene diamines (1 pt. each)
N,N-Di-sec-butylbenzidine
N-Phenyl-N'-cyclohexyl-p-PD
N,N'-Dicyclohexyl-p-PD
N-Phenyl-N'-3,5,5-trimethylcyclohexyl-p-PD
N,N'-Di-2-octyl-p-PD
N,N'-Di-3-(5-methylheptyl)-p-PD
N-Cyclohexyl-N'-(1-isobutyl-3-methylbutyl)-p-PD

[2] (B) Mixture of Antioxidants (1 pt. each)
PBNA (Phenyl-beta-naphthylamine)
BLE-25 (diphenylamine-acetone condensation product)
Polygard (tri(nonylphenyl)phosphite)
Santowhite crystals (a dibutylphenol sulfide)
4-Aminodiphenylamine
p,p'-Dimethoxydiphenylamine
Diphenylamine
Tonox (p,p'-dianilinomethane)
Agerite Resin D (Polymerized 2,2,4-trimethyl-1,2-dihydroquinoline)
N,N'-Diphenyl-p-PD
2,5-Di-t-butylhydroquinone
Hydroquinone
t-Dodecylamine
Santoflex AW
Dipropyleneglycol salicylate ester

[3] Parenthetic value is crack depth obtained with sample aged 238 hrs. at 100° C. which value is better than obtained for the control after only 24 hrs. of aging. After an equal period of aging (238 hrs.) the control sample broke via cracking during the ozone exposure test.

*Table III*

ELASTOMERS OTHER THAN GR-S 1500, CONTAINING ANTIOZONANTS OF THE PRESENT INVENTION

[Dynamic ozone exposure: 40 hrs. at 50±5 p.p.h.m. ozone; 40° C.; 30 flexes per minute—p-PD herein is used to designate para-phenylenediamine]

| Example | Code | Elastomer | Pts. Additive | Pts. Paraffin Wax | "A Value" Crack Depth (Microns) | |
|---|---|---|---|---|---|---|
| | | | | | Unaged | Aged 24 Hrs. at 100° C. |
| Group D: | | | | | | |
| 1 | M-19 | Polybutadiene | 0.25 N-Phenyl-N'-2-octyl-p-PD plus 1.75 pts. of a mixture of 7 other types of arylene-diamines (A) [1] plus 2.0 pts. mixed antioxidants (B).[2] | 1.5 | 155 | 120 |
| 2 | Control | do | 2.0 pts. mixed antioxidants of preceding example. | 1.5 | 365 | 480 |
| Group E: | | | | | | |
| 1 | Control | Natural Rubber | 6.0 Santoflex AW | 1.0 | 70 | 200 |
| 2 | O-39 | do | 3.0 N-Phenyl-N'-2-octyl-p-PD | 1.0 | 70 | 80 |
| 3 | Q-58 | do | 3.0 N-Phenyl-N'-2-tridecyl-p-PD | 0 | 80 | 70 |
| 4 | Q-93 | do | 5.0 N-Phenyl-N'-2-ethylhexyl-p-PD | 0 | 25 | 130 |
| 5 | Q-96 | do | 5.0 N-Phenyl-N'-isopropyl-p-PD | 0 | 0 | 0 |
| 6 | T-15 | do | 1.0 N-Phenyl-N'-isopropyl-p-PD | 0 | 65 | 85 |
| 7 | V-51 | do | 3.0 N-Phenyl-N'-isopropyl-p-PD | 1.0 | 25 | 65 |
| Group F: | | | | | | |
| 1 | Control | Neoprene | None | 0 | 280 | 340 |
| 2 | T-21 | do | 3.0 N-Phenyl-N'-isopropyl-p-PD | 0 | 0 | 0 |
| 3 | T-22 | do | 3.0 N-Phenyl-N'-isopropyl-p-PD | 1.5 | 0 | 0 |
| 4 | R-83 | do | 2.0 N-Phenyl-N'-2-octyl-p-PD plus 1 pt. stannous stearate. | 0 | 0 | 0 |
| 5 | R-84 | do | 2.0 N-Phenyl-N'-2-octyl-p-PD plus 1 pt. stannous stearate. | 1.5 | 0 | 0 |
| Group G: | | | | | | |
| 1 | Control | Alfin type GR-S (79/21)[3] 27 pts. oil extender. | 1.0 PBNA | 0 | 260 | 150 |
| 2 | B-2601 | do | 5.0 N-Phenyl-N'-2-octyl-p-PD | 0 | 0 | 0 |
| Group H: | | | | | | |
| 1 | Control | Hycar 1014 | 1.5 BLE-25 | 1.5 | >700 | >600 |
| 2 | R-97 | do | 5.0 N-Phenyl-N'-2-octyl-p-PD plus 1.5 BLE-25. | 0 | 0 | 50 |
| 3 | T-87 | do | 5.0 N-Phenyl-N'-2-octyl-p-PD | 0 | 30 | 35 |
| Group I: | | | | | | |
| 1 | Control | Butyl Rubber | None | 0 | 100 | 100 |
| 2 | T-36 | do | 5.0 N-Phenyl-N'-(1-ethyl-3-methylpentyl)-p-PD. | 0 | 40 | 0 |
| 3 | T-63 | do | 5.0 N-Phenyl-N'-isopropyl-p-PD | 0 | 20 | |
| 4 | T-64 | do | 5.0 N-Phenyl-N'-isopropyl-p-PD | 1.5 | 20 | |
| 5 | V-59 | do | 5.0 N-Phenyl-N'-isopropyl-p-PD | 0 | 0 | 0 |

[1] (A) Mixture of arylene diamines (1 pt. each)
N,N-Di-sec-butylbenzidine
N-Phenyl-N'-cyclohexyl-p-PD
N,N'-Dicyclohexyl-p-PD
N-Phenyl-N'-3,5,5-trimethylcyclohexyl-p-PD
N,N'-Di-2-octyl-p-PD
N,N'-Di-3-(5-methylheptyl)-p-PD
N-Cyclohexyl-N'-(1-isobutyl-3-methylbutyl)-p-PD

[2] (B) Mixture of Antioxidants (1 pt. each)
PBNA (Phenyl-beta-naphthylamine)
BLE-25 (diphenylamine-acetone condensation product)
Polygard (tri(nonylphenyl)phosphite)
Santowhite crystals (a dibutylphenol sulfide)
4-Aminodiphenylamine
p,p'-Dimethoxydiphenylamine
Diphenylamine
Tonox (p,p'-dianilinomethane)
Agerite Resin D (Polymerized 2,2,4-trimethyl-1,2-dihydroquinoline)
N,N'-Diphenyl-p-PD
2,5-Di-t-butylhydroquinone
Hydroquinone
t-Dodecylamine
Santoflex AW
Dipropyleneglycol salicylate ester

[3] Ratio of butadiene/styrene charged to organo sodium polymerization process was 79/21.

Figure 1:
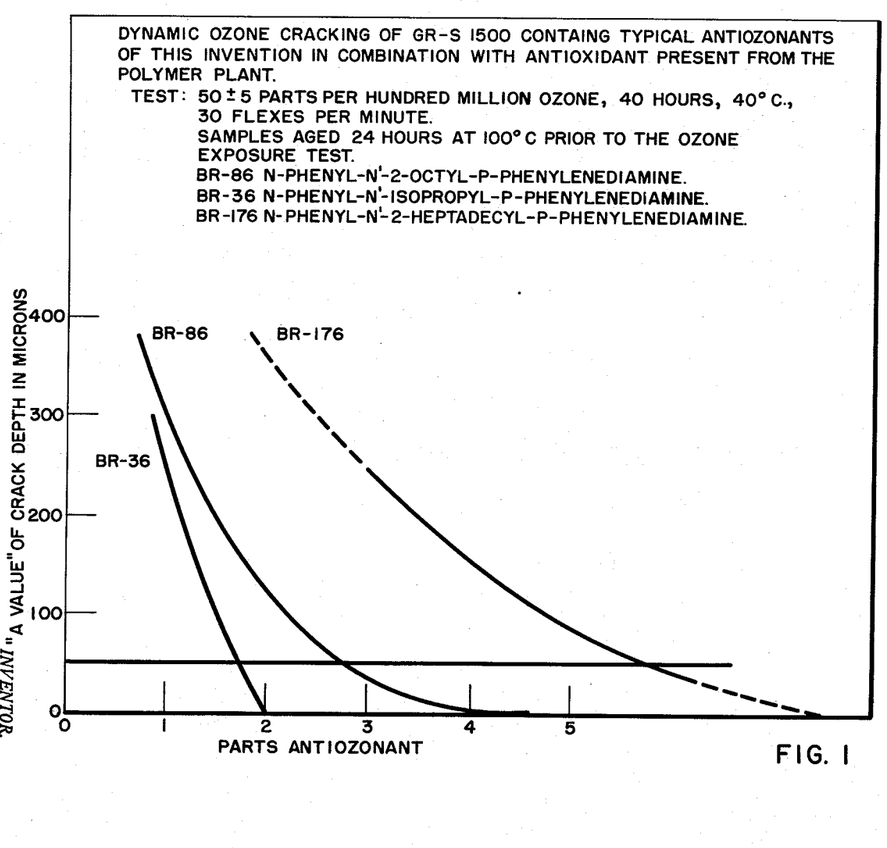
FIGS. 1 and 2 are illustrative charts drawn to simple coordinates.
Figure 2:
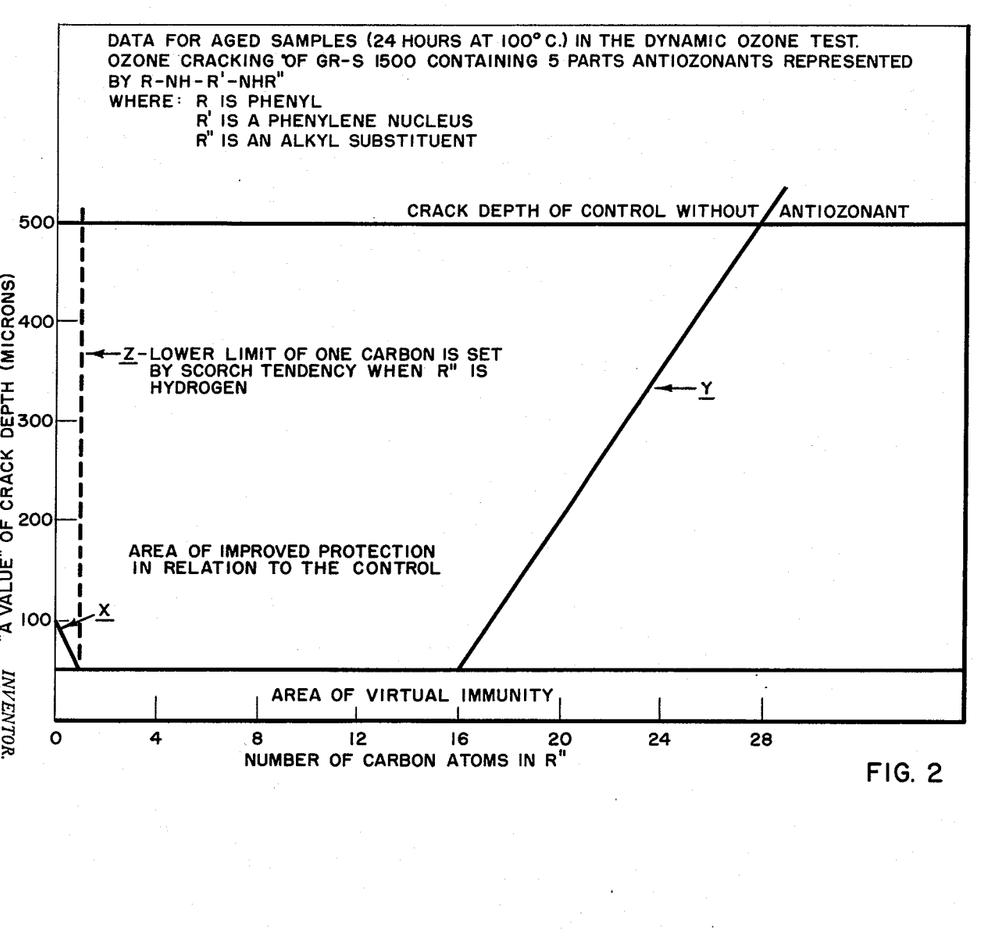

FIGURE 1 shows graphically the change in crack depth in relation to changing concentration for three new antiozonants wherein R" contains 3, 8 and 17 carbon atoms respectively. FIGURE 2 demonstrates the effective range of number of carbon atoms in R". Virtual immunity is defined as the range of crack depth "A value" below 50 microns. The line representing 500 microns crack depth A value represents no improvement over the Santoflex AW control compound simultaneously tested in the dynamic ozone exposure test. The line Y represents the loss of immunity to ozone attack when the ability of the antiozonant to migrate to the surface is too low. Line X in such diagrams (as in copending U.S. application, Ser. No. 523,711) represents loss of immunity to ozone attack; in the present instance it approaches a carbon content of R" equal to zero, at which point the diamine becomes a monophenyl substituted p-phenylenediamine. As pointed out in the foregoing this compound is not acceptable for use in conventional rubber compositions because of its accelerating and scorching tendencies, thus establishing the dotted line Z of FIGURE 2 as the lower limit (one carbon atom) for R" in the range of my new class of antiozonants.

Figure 3:
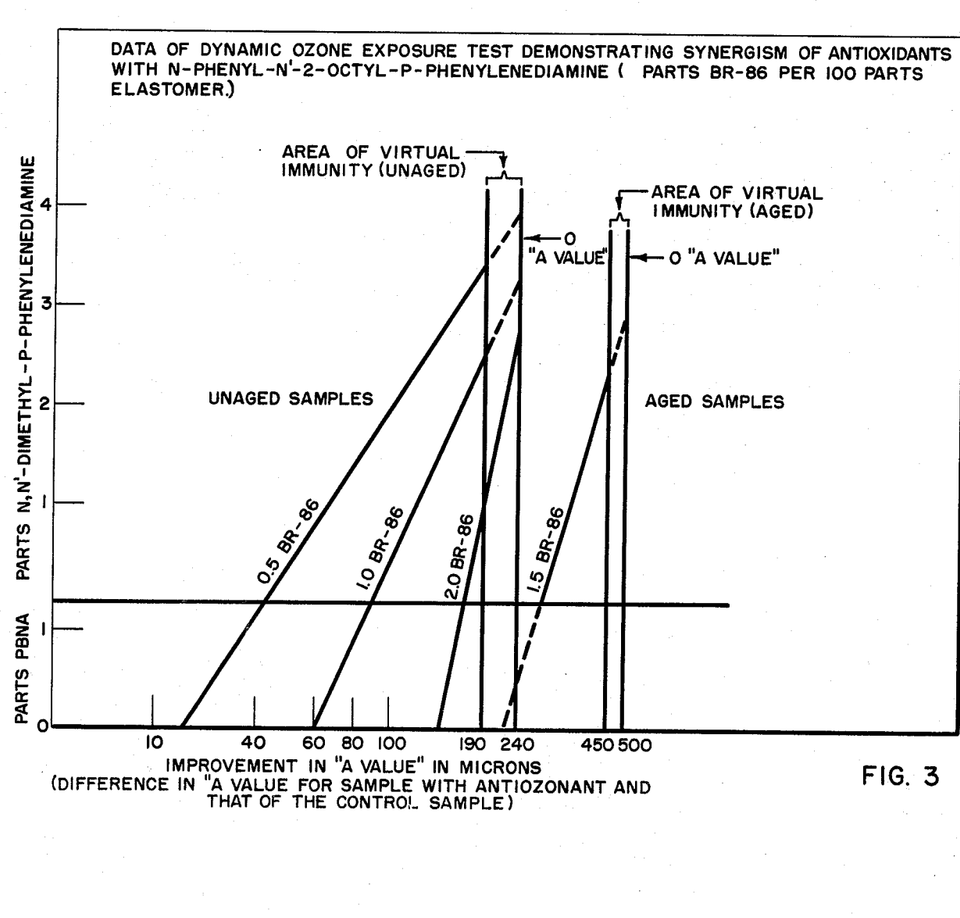
FIGS. 3 and 4 are illustrative charts drawn to seimilogarithmic coordinates.

FIGURE 3 exemplifies synergism discovered with antioxidants wherein less than the minimum amounts of the antiozonants required to give virtual immunity to the elastomer, can be employed in admixtures with antioxidants to attain the equivalent virtual immunity. N,N'-Dimethyl-p-phenylene antioxidant in combination with phenyl-beta-naphthylamine were used in the examples for FIGURE 3; neither of these antioxidants alone are effective for protecting against ozone cracking, yet in combination with as little as 0.5 pt. of N-phenyl-N'-2-octyl-p-phenylenediamine antiozonant these antioxidants formed a synergistic mixture which imparts virtual immunity to unaged samples. When used alone 0.5 part of said antiozonant showed very litle protection in comparison with the control compound.

FIGURE 4 exemplifies synergism obtained with wax in combinations with the antiozonants of the present invention. It is apparent that with increasing amounts of paraffinic wax above 0.5 the synergistic improvement attributed to the wax decreases, i.e., the maximum synergistic effect of the wax is found for the first 0.5 pt. of wax, and most of the improvement attainable with wax is attained by the addition of 1.5 pts. wax.

FURTHER DISCUSSION OF RESULTS

A first aspect of this invention has disclosed new antiozonants which per se in rubber containing insignificant amounts of antioxidants can protect elastomers against ozone cracking. A second aspect has disclosed synergistic combinations of such antiozonants with antioxidants and/or waxes.

I have found that the quantity of antioxidant required to obtain the synergism varies with the antioxidants used. Most of the synergistic combinations of antioxidants of this invention in combination with antioxidants such as those examples of Table A contained at least one part PBNA (added at the GR–S polymerization plants) in addition to the added antioxidants.

From the data obtained in dynamic ozone tests it appeared that 11 of the antioxidants of Table A used only in 2 pts. per 100 pts. elastomer in combination with less than 3 pts. antioxidants of Table I–III per 100 pts. elastomer do not quite attain effective protection in GR–S 1500 compounds, viz:

BLE-25
Diphenylamine
PBNA
Rosin Amine D
Flectol H
1-naphthylamine
Antioxidant 2246
Dipropylene glycol monosalicylate ester
Neozone A
Parazone
Polygard

But it was noted from additional data that these 11 less actively synergistic antioxidants, when augmented by the 1.25 pts. of antioxidant present in commercial GR–S, did give effective synergistic protection of the elastomer with 3 pts. or less of antiozonant similar to the examples of FIGURE 3.

It is accordingly shown that to attain good synergistic activity with those less actively synergistic antioxidants, it is necessary to employ increased quantities thereof, of some other synergist therewith.

With respect to the antiozonants of this invention, the comment as regards the insignificance of less than 1.5 parts total of antioxidants (that show significant synergism when used in greater than such amount) apply. The fact that paraffin wax alone is a better synergist than microcrystalline wax has also been demonstrated. The data obtained with antiozonants of the present invention show the effectiveness of the antiozonant per se, and the synergism therewith of antioxidants and/or waxes. (See FIGURES 1, 2 and 4.) In this connection, it will be noted that (1) the effectiveness of wax as a synergist is developed to a major extent at a wax content of about 1.5 pts. wax with varying amounts of the antiozonant and (2) the improvements in the aged samples from the inclusion of wax with the antiozonant generally parallel those in the unaged samples.

It has been further demonstrated that the beneficial effect of wax in outdoor static tests is obtained. Thus, in static usages even in the absence of synergistic antioxidants, the time to first cracking of GR–S samples containing 2.5 pts. of antiozonants of this invention can be considerably increased by inclusion of 1.5 pts. wax.

The antiozonants of the present invention fall within the general class represented by formula

RNH—R'—NHR"

wherein R' is an arylene radical selected from the group comprising phenylene and hydrocarbon substituted phenylene radicals; R" is a radical selected from the group comprising alkyl and hydrocarbon substituted alkyl, including aralkyl (e.g., benzyl, 1- and 2-phenylethyl, phenyl (higher) alkyl, naphthylmethyl, naphthylethyl, tetrahydronaphthyl alkyl, etc.) and cycloalkyl substituted alkyl (e.g., cyclohexylmethyl, 1- and 2-cyclohexylethyl, etc.); R is an aryl group such as phenyl and alkyl substituted phenyl and cycloalkyl substituted phenyl, and wherein the total number of carbon atoms in the R" hydrocarbon substituent is in the range from 1 to 19 inclusive.

While all compounds represented and defined by the above formula and limitations given therewith per se show antiozone activity in high polymer compositions, it is preferred to use N-phenyl-N'-alkyl-p-phenylene diamines, N-phenyl-N'-aralkyl-p-phenylenediamines and N-phenyl-N'-cyclohexyl substituted alkyl-p-phenylenediamines, wherein the carbon count for the N' substituent is 1 to 19, and which fall into three categories as above set out, only the second of which is claimed in this parent application.

Comparison of the results attained, mutually and with the controls, shows that various synthetic elastomers are protected against ozone by incorporation of one to five parts of these antiozonants therein; and the same considerations show that natural rubber is similarly protected, as well as polyisoprenes prepared synthetically by emulsion polymerization processes, by alkali metal polymerization (e.g., Coral rubber of Firestone Tire & Rubber Co.), by organo-metal alkali catalysts (e.g., the Alfin type of catalyst) or by metal alkyl catalysts (e.g., aluminum trialkyl, lead tetraethyl and combinations of organometallic compounds with metal salts).

The data further demonstrate the application of the present invention to GR–S elastomers, both "hot" and "cold" GR-S to sodium polymerized butadiene and butadiene-styrene mixtures, emulsion polymerized polybutadiene, butadiene-methylvinylpyridine copolymer, butadiene-styrene-methacrylic acid copolymers, neoprene, butyl and Hycar "N-rubber" in that all of these elastomers have been successfully protected against ozone by synergistic antiozonant compositions of the present invention.

In addition to the examples given in the tables, copolymers of styrene and butadiene were prepared which contained small amounts of copolymerized carbonyl-containing monomers such as methylvinylketone, crotonaldehyde or methylisopropenyl ketone and compounded with the antiozonants of this invention, and the results showed that these antiozonants are useful as additives for these carbonyl containing elastomers.

These and other elastomers may be employed as additives, e.g., plasticizers for plastomer products, for which polar elastomers are usually selected. In such cases ozone deterioration of the elastomer component is prevented by the antiozonants of this invention.

The samples shown in the tables cover the principal types of elastomers, above described, but the range of polymers and combinations protected against ozone attack by the present antiozonants is not limited thereto, as similar protection has been obtained with plastomer compositions containing elastomers such as butyl rubber, neoprene, polybutadiene, GR-S, acrylonitrile rubbers, etc., which elastomers per se show less susceptibility to ozone attack.

Butyl rubber is known to be less susceptible to ozone attack than are GR-S elastomers. However, ozone cracking of butyl vulcanizates is an industrial problem for certain uses as evidenced by the study of D. C. Edwards and E. B. Storey, Transactions of the Institution of the Rubber Industry, pp. 45–69, vol. 31, No. 2, April 1955. I have found butyl rubber when plasticized with oils as commercially practiced to be considerably attacked by ozone. We have demonstrated that the anti-ozonants and synergistic antiozonant compositions of the present invention when appropriately compounded into butyl rubber are capable of protecting the resulting butyl vulcanizates against ozone attack. In like manner plasticized neoprene compounds are protected against ozone attack by appropriate use of antiozonants and antiozonant compositions of this invention.

The appropriate incorporation of the new antiozonant compositions, i.e., combinations of the substituted phenylenediamines with amino antioxidants and/or waxes (and/or metal salts such as certain metal fatty acid salts of said copending joint U.S. application, Ser. No. 523,711) gives virtual immunity against much higher than ordinary atmospheric concentrations of ozone, to elastomer compositions, even when the same have been subjected to radical heat-aging, thus showing that these antiozonant combinations are capable of protecting the products for long periods of time under dynamic as well as static conditions and at elevated temperatures.

The invention has further shown that when the total carbons of the compounds are kept within designated ranges the antiozonants are highly effective in aged stocks, it being thus shown that the ranges are critical for the protection of products subjected to high temperatures resulting from dynamic usage or otherwise, but may be broadened to some extent (e.g., a carbon count of say eight carbons less than the heat-aged ranges) and still be suitable for protection of static goods not subject to elevated temperatures or dynamic usages.

As also noted above, the elastomers used in the examples of the tables herein generally contained antioxidant material capable of withstanding vulcanization, usually PBNA, but sometimes BLE. Such antioxidant materials afford no protection against ozone attack of the principal products, nor do they effectively enable the other antioxidants of Table A to do so. From the observed data, however, it is shown that in combination with the new antiozonants, the PBNA and other specific antioxidant materials have a synergistic effect enabling smaller quantities of the antiozonants of the present and the other specified inventions to effectively protect the products against ozone attack.

In general, from 1 to 5 pts. of the new diamine antiozonant per 100 of rubber in the absence of added antioxidants is adequate for practice of the present invention in protection of statically employed items (prepared from natural and synthetic rubbers) for practical periods of time against deterioration due to ozone attack; 2.25 or more parts are preferred for elastomer items in dynamic usages. In synergistic combinations, however, from 0.5 to 3 pts. of the substituted p-phenylenediamines of this invention are sufficient to provide ozone protection for the elastomer compounds for both static and dynamic usage.

The amount of antiozonant compositions containing synergistic antioxidants and/or waxes required to give ozone protection to elastomers varies with the type of antioxidants and metal salts (part III of said copending joint invention) employed and depends on whether the antioxidants and metal salts are used in combination or singly; in general, for the practice of the present invention the total amount of synergistic additives varies from 1.25 to 6 pts. per hundred of elastomer. The use of small amounts of waxes in rubber compounds together with antioxidants of course is recognized in the prior art. However, the appropriate combination of waxes with the antiozonants of the present invention, both with and without synergistic antioxidants to develop synergistic antiozonant compositions, constitutes an unforeseeable and a valuable advance in the protection of elastomer and plastomer compositions against ozone cracking, in view of the fact that waxes were heretofore considered to be harmful for ozone resistance of elastomers in dynamic usage.

The antiozonants and synergistic antiozonant compositions of the present invention have also been found to be effective in protection against ozone cracking of plastomers which have residual unsaturation or active hydrogens such as may be present in methylene or methinyl groups. Thus, resins or plastomer compositions comprising polymers and copolymers of vinylchloride, vinylacetate, alkylacrylates, etc., in combination with unsaturated polymer ingredients, are subject to attack by ozone, and such attack is avoided when the new antiozonants are present in such compositions.

In summarizing the parts of this invention it has been demonstrated that: (1) antiozonants of the formula R—NH—R'—NH—R" (as defined above) when used in from 1 to 5 pts. in 100 pts. elastomer and/or plastomer protect the elastomer compound against ozone attack; for protection against unduly high concentrations of ozone larger amounts are effectively used (e.g., up to 7.5 pts.); (2) when the antiozonants of (1) are combined with appropriate quantities of antioxidants of the several classes of antioxidants and/or waxes, synergistic antiozonant compositions are formed wherein reduced amounts of antiozonants will serve to protect elastomer compositions.

It has further been demonstrated that the new antiozonants and synergistic antiozonant compositions can be compounded with the elastomers in the Banbury mixer, on the rubber mill, or by incorporation in the elastomer latices either at the polymer plant or by the consumer at any time prior to coagulation and drying to produce compounds stabilized against ozone.

The research has shown that the new compounds are valuable antiozonants for plastomers and resins as well as for natural and synthetic rubbers and are particularly useful antiozonants for tires and similar natural and synthetic products (subject to ozone attack) which attain high operating temperatures, such as those temperatures attained by heavy duty truck tires, and such temperatures may even rise to 300° F. in use. Antiozonants are herein defined as additive agents which protect the polymeric material, e.g., natural and synthetic rubbers, against deterioration due to ozone attack. While serving as antiozonants the new compositions also serve as antioxidants, i.e., the new products of this invention protect against deterioration of tensile properties of rubber compounds due to attack by oxygen and sunlight. However, the antioxidants must not be too reactive with oxygen or they can too rapidly disappear from the compounds incorporating them and ozone protection will thereafter be absent.

The present new class of compounds as herein defined, as well as each synergistic composition described herein is specific and differs in general from other amines such as diarylamines, arylenediamines, and their derivatives, and mixtures with other types of antioxidants in that other members of these general categories and their mixtures will not effectively protect against attack by ozone as is demonstrated by the research summarized hereinbefore.

These new antiozonant compositions have also been found effective in protection of elastomer dispersions such as latices of natural rubber, GR-S elastomers, neoprene, acrylonitrile copolymeric elastomers, and the like which are to be used for coating and film-forming purposes, e.g., for paper coatings, wall paints, etc. By incorporation of the new antiozonant compositions in the latices together with the vulcanizing ingredients, the subsequently formed cured films therefrom are effectively protected against ozone cracking.

An "antiozonant composition" as used herein denotes any of the amine antiozonants represented by as herein defined, as well as each and every synergistic composition described in the preceding discussion whether containing one or more of each class of synergists described, i.e., waxes, certain metal salts, and the designated classes of antioxidants.

Herein the term elastomer is employed to designate an elastic polymer or macromolecule, whether a naturally-occurring material or a synthetic polymeric substance. Plastomer is defined as including both thermoset and thermoplastic high-molecular weight resinous and plastic materials. These definitions follow those used by Harry L. Fisher, Industrial and Engineering Chemistry, vol. 31, p. 942 (1939).

While there have been described herein what are at present considered preferred embodiments of the invention, it will be obvious to those skilled in the art that minor modifications and changes may be made without departing from the essence of the invention. It is therefore to be understood that the exemplary embodiments are illustrative and not restrictive of the invention, the scope of which is defined in the appended claims, and all modifications that come within the meaning and range of equivalency of the claims are intended to be included therein.

I claim:

1. The method of protecting from ozone attack under both static and dynamic conditions rubbery material selected from the class consisting of natural rubber, polybutadiene, polychloroprene, butadiene-styrene rubbery copolymer, butadiene-acrylonitrile rubbery copolymer, and blends of the foregoing, which consists essentially in incorporating into said rubbery material, per 100 parts by weight thereof, 2.25 to 7.5 parts by weight of substituted p-arylene diamine represented by the formula wherein R is a phenyl radical, R' is a phenylene radical, and R" is a radical selected from the class consisting of unsubstituted and phenyl-substituted straight chain and branched chain secondary and tertiary alkyl radicals containing from 4 to 19 carbon atoms.

2. Rubbery material selected from the class consisting of natural rubber, polybutadiene, polychloroprene, butadiene-styrene rubbery copolymer, butadiene-acrylonitrile rubbery copolymer, and blends of the foregoing, and containing in an amount effective to protect it from ozone attack in both static and dynamic usage, substituted p-arylene diamine represented by the formula wherein R is a phenyl radical, R' is a phenylene radical, and R" is a radical selected from the class consisting of unsubstituted and phenyl-substituted straight chain and branched chain secondary and tertiary alkyl radicals containing from 4 to 19 carbon atoms, said effective amount consisting of about 2.25 to 7.5 parts by weight per 100 parts of the rubbery material.

3. A synergistic antiozonant composition for incorporation in rubbery material selected from the class consisting of natural rubber, polybutadiene, polychloroprene, butadienestyrene rubbery copolymer, butadiene-acrylonitrile rubbery copolymer, and blends of the foregoing, for protecting said rubbery material from ozone attack under static and dynamic conditions, said composition consisting essentially of the combination of (a) from 1 to 9 parts of substituted p-arylene diamine represented by the wherein R is a phenyl radical, R' is a phenylene radical, and R" is a radical selected from the class consisting of unsubstituted and phenyl-substituted straight chain and branched chain secondary and tertiary alkyl radicals containing from 4 to 19 carbon atoms, with conversely from 9 parts to 1 part of (b) material synergistic therewith and selected from the class of synergists consisting of group (i) the paraffin and microcrystalline waxes and group (ii) the antioxidants 6-ethoxy-2,2,4-trimethyl-1,2-dihydroquinoline;
2,2,4-trimethyl-1,2-dihydroquinoline polymer;
diphenylamine-acetone condensation products;
phenyl-beta-naphthylamine;
phenyl-alpha-naphthylamine;
aniline-acetone condensation products;
aniline-butyraldehyde condensation products;
di-alpha-naphthylamine;
di-beta-naphthylamine;
phenylenediamine,
o-, m-, and p-forms;
p,p'-diaminodiphenylmethane;
p-aminodiphenylamine;
1,2-dianilinoethane;
o-tolidine;
N,N'-diphenyl-p-phenylenediamine;
naphthalenediamine;
di-p-methoxydiphenylamine;
N,N'-di-sec-butyl-p-phenylenediamine;
N,N'-di-beta-naphthyl-p-phenylenediamine;
N,N'-di-beta-actetrahydronaphthyl-p-phenylenediamine;
N,N'-di-alpha-naphthyl-p-phenylenediamine;
tetraethylenepentaminopropionitrile;
mixture of isopropoxydiphenylamine, diphenylphenylenediamine and phenyl-beta-naphthylamine;
dehydroabietylamine;
dodecylamine-1;
N,N'-tetramethyl-p,p'-di(aminophenyl)-methane;
N-dimethyl-p-phenylene diamine;
p-phenylphenol;
2,5-di-tert-butyl hydroquinone;
hydroquinone;
2,2'-methylene-bis(6-tert-butyl-p-cresol);
4,4'-thio-bis(6-tert-butyl-m-cresol);
triphenyl phosphite;
tri(nonylphenyl) phosphite;
glycerol monosalicylate ester;

dipropylene glycol monosalicylate ester;
thioacetanilide;
thiocarbonilide;
thioacetamide;
dibenzylthiourea;
phenylacetothiomorpholide;
and (iii) combinations of the foregoing.

4. The method of protecting from ozone attack under both static and dynamic conditions rubbery material selected from the class consisting of natural rubber, polybutadiene, polychloroprene, butadiene-styrene rubbery copolymer, butadiene-acrylonitrile rubbery copolymer, and blends of the foregoing, which consists essentially in incorporating into 100 parts by weight of said rubbery copolymer an effective quantity in the range of about 2.25 to 7.5 parts by weight of synergistic antiozonant composition according to claim 3, the quantity of said synergistic antiozonant composition employed in said range imparting to 100 parts by weight of the unsaturated high polymer from about 3 parts by weight of the antiozonant (a), when the composition comprises a small proportion of said synergistic material, to about 0.5 part by weight of the antiozonant (a) when the composition comprises a large proportion of said synergistic material.

5. An ozone resistant combination containing 100 parts by weight of rubbery material selected from the class consisting of natural rubber, polybutadiene, polychloroprene, butadiene-styrene rubbery copolymer, butadiene-acrylonitrile rubbery copolymer, and blends of the foregoing, and containing an effective quantity in the range of about 2.25 to 7.5 parts by weight of synergistic antiozonant composition according to claim 3, the quantity of said synergistic antiozonant composition employed in said range imparting to 100 parts by weight of the rubbery material from about 3 parts by weight of the antiozonant (a), when the composition comprises a small proportion of said synergistic material, to about 0.5 part by weight of said antiozonant (a) when said composition comprises a large proportion of said synergistic material, and serving to protect the combination from ozone attack under both static and dynamic conditions.

6. A diolefin polymer rubber vulcanizate comprising by weight 100 parts of said rubber, .5-3 parts of an N-alkyl-N'-phenyl-p-phenylenediamine wherein the said alkyl group contains from 2 to 9 carbon atoms and 1.5-6 parts of microcrystalline wax.

7. A method of stabilizing a vulcanizable diene hydrocarbon rubber against cracking due to ozone which comprises incorporating in said rubber from about 1% to about 5% by weight of N-(1-ethyl-3-methyl pentyl)-N'-phenyl-p-phenylene diamine.

8. A diolefin polymer rubber vulcanizate comprising by weight 100 parts of said rubber, 0.5-3 parts of an N-alkyl-N'-phenyl-p-phenylene-diamine wherein the said alkyl group contains from 2 to 9 carbon atoms and 0.5-6 parts of microcrystalline wax.

References Cited in the file of this patent

UNITED STATES PATENTS

| | | |
|---|---|---|
| 2,166,223 | Semon | July 18, 1939 |
| 2,734,808 | Biswell | Feb. 14, 1956 |
| 2,822,395 | Dent | Feb. 4, 1958 |

FOREIGN PATENTS

| | | |
|---|---|---|
| 23,533 | Australia | July 17, 1935 |
| 520,097 | Great Britain | Apr. 15, 1940 |
| 751,630 | Great Britain | July 4, 1956 |

OTHER REFERENCES

Shaw et al.: "Antioxidants for GR–S Rubber," Rubber World, vol. 130, August 1954, pp. 636–642.